(12) United States Patent
Elder et al.

(10) Patent No.: US 8,931,809 B2
(45) Date of Patent: Jan. 13, 2015

(54) TUBULAR THREADED CONNECTION

(71) Applicants: Vallourec Oil and Gas France, Aulnoye-Aymeries (FR); Nippon Steel & Sumitomo Metal Corporation, Chiyoda-ku (JP)

(72) Inventors: Russell Elder, Houston, TX (US); Bertrand Maillon, Houston, TX (US); Yousuke Oku, Amagasaki (JP)

(73) Assignees: Vallourec Oil and Gas France, Aulnoye-Aymeries (FR); Nippon Steel & Sumitomo Metal Corporation, Chiyoda-ku (JP)

( * ) Notice: Subject to any disclaimer, the term of this patent is extended or adjusted under 35 U.S.C. 154(b) by 150 days.

(21) Appl. No.: 13/623,904

(22) Filed: Sep. 21, 2012

(65) Prior Publication Data

US 2014/0084582 A1    Mar. 27, 2014

(51) Int. Cl.
*F16L 35/00*    (2006.01)

(52) U.S. Cl.
USPC ............................................. 285/334

(58) Field of Classification Search
CPC ...... F16L 15/002; F16L 15/007; E21B 17/08; E21B 17/02; E21B 17/0423
USPC ....................................................... 285/334
See application file for complete search history.

(56) References Cited

U.S. PATENT DOCUMENTS

| | | | |
|---|---|---|---|
| 4,753,460 A * | 6/1988 | Tung | 285/331 |
| 5,338,074 A | 8/1994 | Barringer et al. | |
| 5,454,605 A | 10/1995 | Mott | |
| 6,050,610 A | 4/2000 | Enderle | |
| 6,123,368 A | 9/2000 | Enderle | |
| 6,158,785 A | 12/2000 | Beaulier | |
| 6,174,001 B1 | 1/2001 | Enderle | |
| 6,206,436 B1 | 3/2001 | Mallis | |
| 6,270,127 B1 | 8/2001 | Enderle | |
| 6,530,607 B1 | 3/2003 | Mallis | |
| 6,796,711 B2 | 9/2004 | Colson | |
| 7,007,984 B2 * | 3/2006 | Church | 285/334 |
| 7,243,957 B2 | 7/2007 | Reynolds, Jr. | |
| 7,458,616 B2 | 12/2008 | Reynolds, Jr. | |
| 7,469,938 B2 | 12/2008 | Sivley, IV | |
| 7,500,698 B2 | 3/2009 | Reynolds, Jr. | |
| 7,527,304 B2 | 5/2009 | Mallis | |
| 7,575,255 B2 | 8/2009 | Reynolds, Jr. | |

(Continued)

OTHER PUBLICATIONS

U.S. Appl. No. 13/623,905, filed Sep. 21, 2012, Elder et al.

(Continued)

*Primary Examiner* — David E Bochna
(74) *Attorney, Agent, or Firm* — Oblon, Spivak, McClelland, Maier & Neustadt, L.L.P.

(57) ABSTRACT

A threaded tubular connection includes a first tube and a second tube. The first tube includes a pin member and the second tube includes a box member. A cross-sectional area of a pin critical cross-section is within approximately ±5% of cross-sectional area of a box critical cross-section of the box member. The cross-sectional areas of each of the pin and box critical cross-sections are within approximately ±5% of the sum of the cross-sectional areas of a box intermediate critical cross-section of the box member and a pin intermediate critical cross-section of the pin member. In a made-up state, a first seal surface on the pin engages a second seal surface on the box in a radial direction so as to form an off-center fluid tight seal that extends in an axial direction of the threaded tubular connection.

20 Claims, 6 Drawing Sheets

(56) References Cited

U.S. PATENT DOCUMENTS

| | | |
|---|---|---|
| 7,717,478 B2 | 5/2010 | Reynolds, Jr. |
| 7,810,849 B2 | 10/2010 | Reynolds, Jr. |
| 7,828,337 B2 | 11/2010 | Reynolds, Jr. |
| 7,850,211 B2 | 12/2010 | Reynolds, Jr. |
| 7,942,454 B2 | 5/2011 | Reynolds, Jr. |
| 7,988,205 B2 | 8/2011 | Mallis |
| 8,029,025 B1 | 10/2011 | Sivley, IV |
| 2007/0158943 A1 | 7/2007 | Mallis |
| 2012/0043756 A1 | 2/2012 | Elder et al. |
| 2012/0074690 A1 | 3/2012 | Mallis |

OTHER PUBLICATIONS

U.S. Appl. No. 13/623,904, filed Sep. 21, 2012, Elder et al.

\* cited by examiner

TUBULAR THREADED CONNECTION

BACKGROUND

1. Field of the Invention

The present invention relates to tubular threaded connections, and joints or assemblies of tubes to be joined by threads.

2. Discussion of the Background

The tubes described herein are used in industry and, in particular, assemblies or threaded junctions used in stringlines for tubing or for lines of tubular production accessories or for a casing or a liner or a riser for the operation or prospecting or exploitation of oil or gas wells. The threaded assemblies or junctions described herein may also be used for any purpose where it may be desired to assemble pipelines or tubular accessories such as, for example, in geothermal or steam plants. The threaded assembly described herein is particularly useful in the assembly of metal tubes used for the casing of oil or gas wells or for so-called liners beyond the bottom of the casing string, as explained below.

Numerous types of assemblies are known for petroleum or gas carrying tubes that yield satisfactory results from the viewpoint of mechanical characteristics and tightness, even under tough conditions of use. Certain of these assemblies involve the use of tubes equipped with male frustoconical threads at both ends, which are assembled by couplings having two corresponding female frustoconical threads. This manner of assembly offers the advantage of rendering the two components of the assembly rigid, due to the existence of the positive interference that one can create between the male threads and the female threads.

However, the external diameter of these couplings is greater than that of the corresponding tubes and, when these assemblies are used with casing tubes, the couplings require that bore holes with increased diameter be drilled to accommodate the external diameter of the couplings. In the case of very deep wells, with a depth exceeding 4,000 meters, the initial diameter of the well first casing strings and consequently the diameter of the well in the vicinity of the surface may be twice as large using these couplings as it could be using slim couplings having an external diameter only slightly larger than the corresponding tubes of the casing strings.

To prevent this difficulty, one may use assemblies without a coupling or sleeve. In this case, the tubular elements each have one male threaded end and one female threaded end, making for a thin assembly. These assemblies or junctions are generally referred to as integral assemblies or junctions, in contrast to assemblies or junctions employing a coupling or sleeve. The same need for integral junctions is also met in the case of liners which are hung on the casing string at the bottom thereof, are not cemented to the borehole and often run horizontally to reach the oil or gas producing formation. In particular, exploitation of non-conventional gas reservoirs, such as so-called shale gas reservoirs, require such small diameter and slim liners with integral junctions.

Integral assemblies are generally made on tubes which include an expanded diameter at the end corresponding to the female threads, and a reduced diameter at the end corresponding to the male threads. This is done in order to have sufficient material in the thickness of the tubes to ensure the geometric and mechanical strength of the assembly that joins the tubes.

It is also possible to reinforce the strength of the male-female assembly by using threads in two successive sections, or steps, instead of only a single one. Each of the steps of threads has different thread diameters and is separated by a central ring-shaped abutment. This abutment makes it possible to achieve sufficient tightening of the threads while at the same time avoiding excessive on-screwing. In the case of threads with negative load flanks, the abutment makes it possible to tighten these threads on their negative flanks and this reduces risks of thread disengagement due to the action of traction stresses that may or may not be combined with strong pressures. However, an abutment between steps of threads requires allocation of radial material thickness within the junction assembly, thereby increasing the overall outer diameter of the assembly at the junction.

SUMMARY OF EXEMPLARY ASPECTS OF THE ADVANCEMENTS

In one example, a threaded tubular connection including a first tube (also referred to as a first tubular member) and a second tube (also referred to as a second tubular member) is provided. The connection can be, for example, a threaded semi-flush connection. The first tube includes a pin member (also referred to as a tubular male end) which extends from an end of a main body of the first tube to a terminal end of the first tube. The main body of the first tube can have substantially constant inside and outside diameters along an axial direction of the first tube. The pin member includes two radially offset sections (steps) of external threads. The two radially offset sections of external threads include a first thread section and a second thread section. The first thread section is separated from the second thread section by a first seal surface. The first thread section is located between the terminal end of the first tube and the first seal surface and the second thread section is located between the first seal surface and the end of the main body of the first tube.

The second tube includes a box member (also referred to as a tubular female end) which extends from an end of a main body of the second tube to a terminal end of the second tube. The main body of the second tube can have substantially constant inside and outside diameters along an axial direction of the second tube. The box member includes two radially offset sections (steps) of internal threads. The two radially offset sections of internal threads include a third thread section and a fourth thread section. The third thread section is separated from the fourth thread section by a second seal surface. The third thread section is located between the terminal end of the second tube and the second seal surface, and the fourth thread section is located between the second seal surface and the end of the main body of the second tube. In a made-up state, the first seal surface engages the second seal surface in a radial direction so as to form a fluid tight off-center seal that extends in an axial direction of the threaded tubular connection.

Each of the two steps of tapered threads includes a run-in portion on a side of a terminal end of a respective one of the first tubular member and the second tubular member and a run-out portion on the opposite side. Each run-in portion on the first tubular member engages a run-out portion on the second tubular member, and each run-in portion on the second tubular member engages a run-out portion on the first tubular member. An outside diameter of the box is no more than 10% (preferably no more than 6%) greater than a nominal outside diameter of the first and second tubular members.

The pin member has a pin critical cross-section (PCCS) located at a thread root of the second thread section that is closest to the end of the main body of the first tube. The PCCS undergoes full tension transferred across all threads of the pin. The box member has a box critical cross-section (BCCS) located at a thread root of the fourth thread section that is closest to the end of the main body of the second tube. The BCCS undergoes full tension transferred across all threads of the box. The box member has a box intermediate critical cross-section (BICCS) located at a thread root of the third thread section that is closest to the second seal surface of the second tube. The BICCS undergoes tension transferred across the third thread section of the box. The pin member has a pin intermediate critical cross-section (PICCS) located at a thread root of the first thread section that is closest to the first seal surface of the first tube. The PICCS undergoes tension transferred across the first thread section of the pin. In one embodiment of the present invention, the first and second tubes satisfy the following relationships:

PCCS is within approximately ±5% of BCCS,
each of PCCS and BCCS is within approximately ±5% (BICCS+PICCS), and
BICCS/PICCS is not less than 2.0.

In another embodiment of the present invention, the first and second tubes satisfy the following relationships:

PCCS is within approximately ±5% of BCCS,
each of PCCS and BCCS is within approximately ±5% (BICCS+PICCS), and
an overall length of the second thread section divided by an overall length of the first thread section is not less than 2.0.

BRIEF DESCRIPTION OF THE SEVERAL VIEWS OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Certain terminology used in the following description is for convenience only and is not limiting. The terms "assembly" or "joint" or "junction" are intended to have the same meaning in the following description, with the exception of when each of these terms is used in a particular context that gives a particular term further meaning. The term "pipes" is intended to encompass any type of tubes or tubular components or tubular accessories currently in existence or likely to be put to use in industry. The terms "abutment" or "abutment surface" or "shoulder" are intended to have the same meaning in the following description, with the exception of when each of these terms is used in a particular context that gives a particular term further meaning.

U.S. Pat. No. 5,687,999 describes a connection with two fluid tight metal-to-metal seal surfaces at the internal and external ends of the joint, beyond the ends of the threaded portions. The entire contents of U.S. Pat. No. 5,687,999 are incorporated herein by reference, and FIGS. 2 and 3 of U.S. Pat. No. 5,687,999 are reproduced as FIGS. 4 and 5 of the present disclosure.

Figure 4:
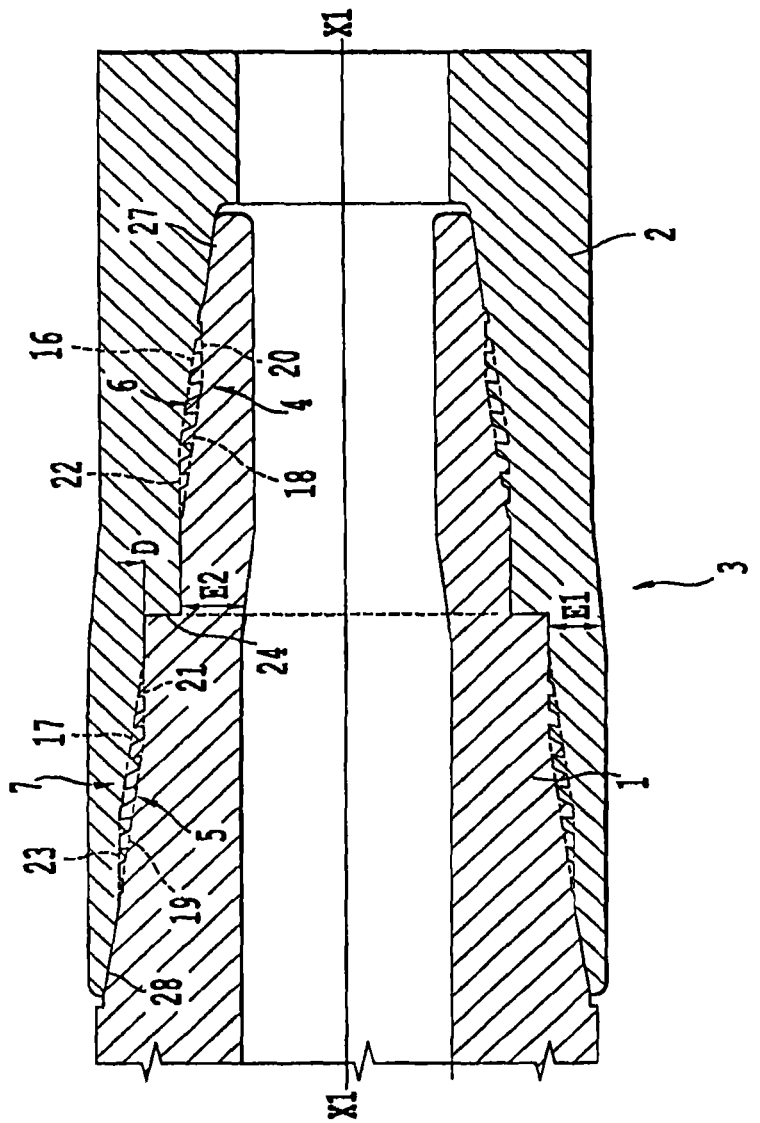
FIG. 4 is a cross-sectional view of a conventional joint that includes a center shoulder and end seals near the terminal ends of the pin and box.

As shown in FIG. 4, in this example, each male and female element has a region with two threading sections, respectively threading sections 4, 5, for male element 1 and threading sections 6, 7 for female element 2, between which is located a ring-shaped abutment surface or shoulder 24. The mid-portions of these threading sections 4, 5 and 6, 7 are frustoconical.

The four frustoconical threading sections 4, 5 of the male element, and 6, 7 of the female element, have at each of their ends a zone of vanishing threads in which the heights of the threads diminishes to a zero value. The decrease in the height of the threads may be accomplished either by machining the crests of the threads to a constant diameter with respect to the axis of the male or female element to generate a so-called run-out thread portion, or by machining constant diameter thread roots with respect to the axis to generate a so-called run-in thread portion. By assembling the two male and female elements, their threads engage completely in the corresponding housings, both in the mid-portions of the threadings and in the end zones with the vanishing threads.

As shown in FIG. 4, in these end zones, the crests and roots of the vanishing threads are limited toward the outside or toward the inside by the convergence of a frustoconical major diameter 16, 17 or a frustoconical minor diameter 18, 19, each of which prolongs the surface of the mid-portion of the threading, and a cylindrical minor diameter 20, 21 or a cylindrical major diameter 22, 23. One can see that the difference between the diameters of these cylindrical surfaces 21 and 22 corresponds to the radial height "D" of the ring-shaped abutment or shoulder 24 in the central zone of assembly 3. This ring-shaped abutment or shoulder 24 is made up by having the two surfaces of male element 1 and female element 2 which abut against each other.

In the joint illustrated in FIG. 4, the abutment 24 does not perform any tightness or sealing function. In particular, the abutment 24 does not provide a seal under all normal operating conditions of the assembly. Instead, two fluid tight metal-to-metal seal surfaces 27, 28 are arranged at the internal and external ends of the joint, beyond the ends of the threaded portions.

Figure 5:
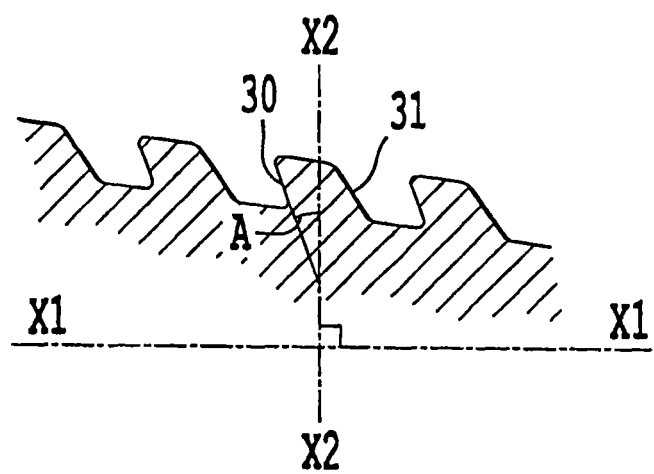
FIG. 5 is a partial cut-away view along axis X1-X1 of a profile a male frustoconical threading section.

As shown in FIG. 5, the load flanks of the male threads, such as 30, have a generating line with a negative inclination A of about −3° to −20°, with respect to a line extending perpendicularly to axis X1-X1 of the element. Upon screwing, the cooperation between these threads with negative load flank and abutment 24 makes it possible to tighten male element 1 and female element 2 against each other. This practically eliminates the risks of disjointing or separation at the threads.

In the connection illustrated in FIGS. 4 and 5, the shoulder (or abutment) surfaces on the male and the female elements, perpendicular to the X1-X1 axis, increase, for a given radial difference D, the mechanical strength of the joint. Consequently it is also possible to give the critical thicknesses E2 on male element 1 and E1 on the female element 2, a value as large as possible. The absence of metal/metal tightness surfaces in the central zone—surfaces whose effectiveness is, as already explained, not satisfactory according to U.S. Pat. No. 5,687,999 due to the rigidity of this zone—makes it possible to move the two frustoconical threading sections closer to each other, and thus to improve according to said patent the joining action between the two male and female elements.

However, because of the radial space occupied by the sealing surfaces 27 and 28 located at thick wall locations in the connection shown in FIG. 4, the high sealing properties of this connection do not result in a high tensile efficiency. In particular, Applicants have determined the tensile efficiency of the connection shown in FIG. 4 only achieves a 70 to 80% tensile efficiency. The tensile efficiency of a connection is the ratio of the smallest "critical section" of the threads to the pipe body cross-section and limits the performance of the connection. On the other hands, increasing the thickness of the ends of the male and female portions diminishes the size of the center shoulder area, and thus reduces the connection's resistance to compression.

Figure 1:
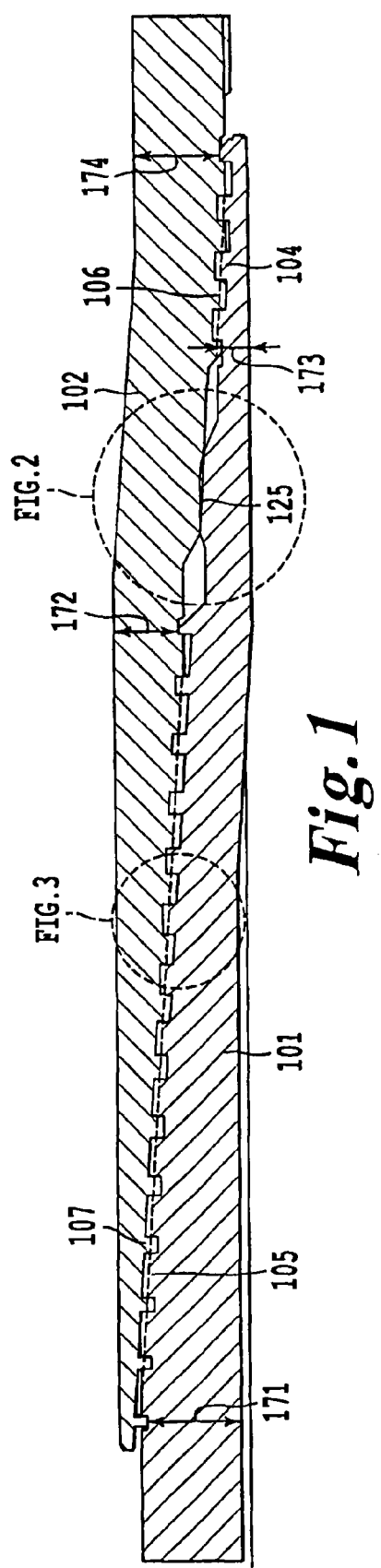
FIG. 1 is a cross-sectional view of a joint with the male and female tubular elements assembled together according to a non-limiting embodiment of the present invention.
Figure 2:
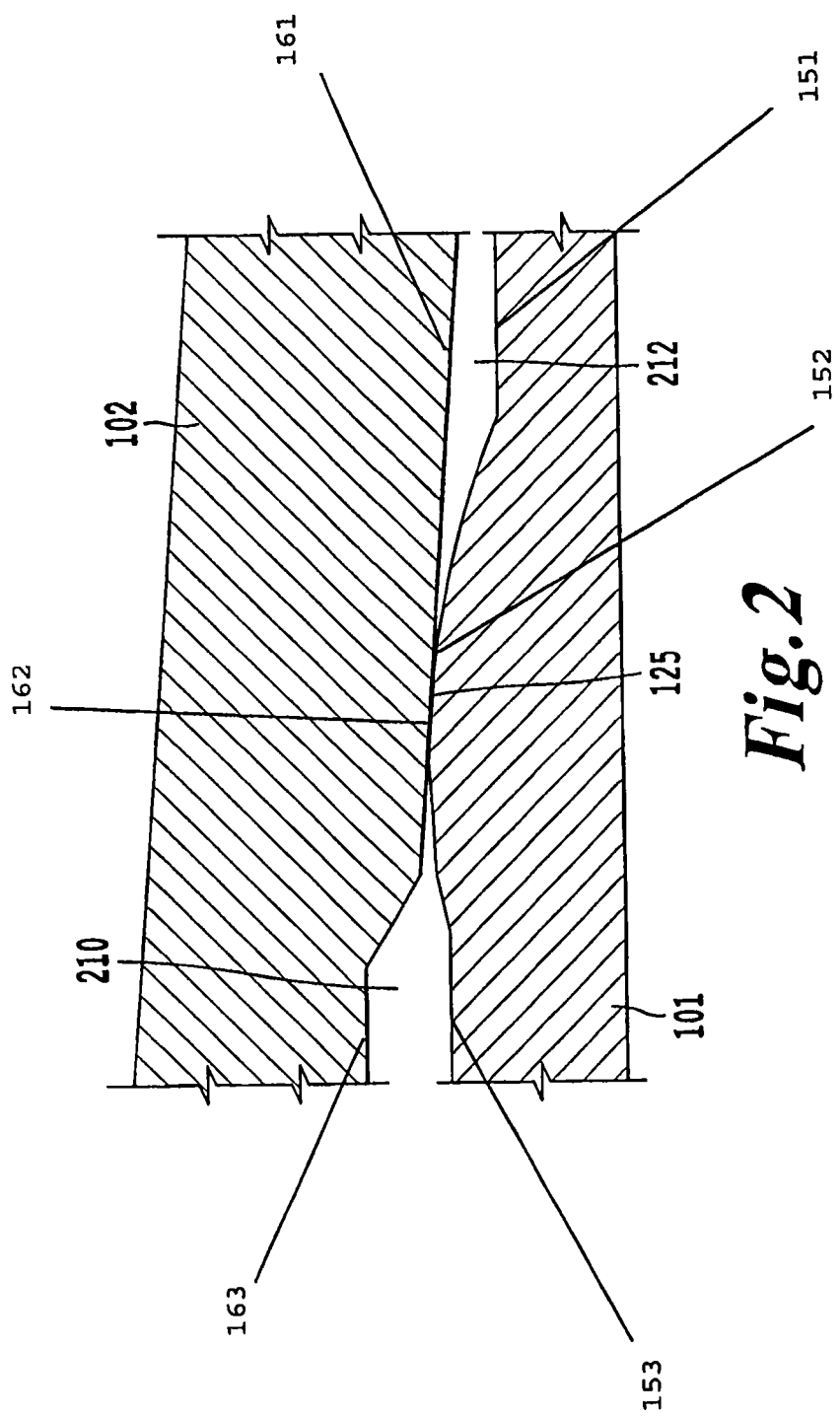
FIG. 2 is a detailed cross-sectional view of the seal portion of the joint illustrated in FIG. 1, according to a non-limiting embodiment of the present invention.
Figure 3:
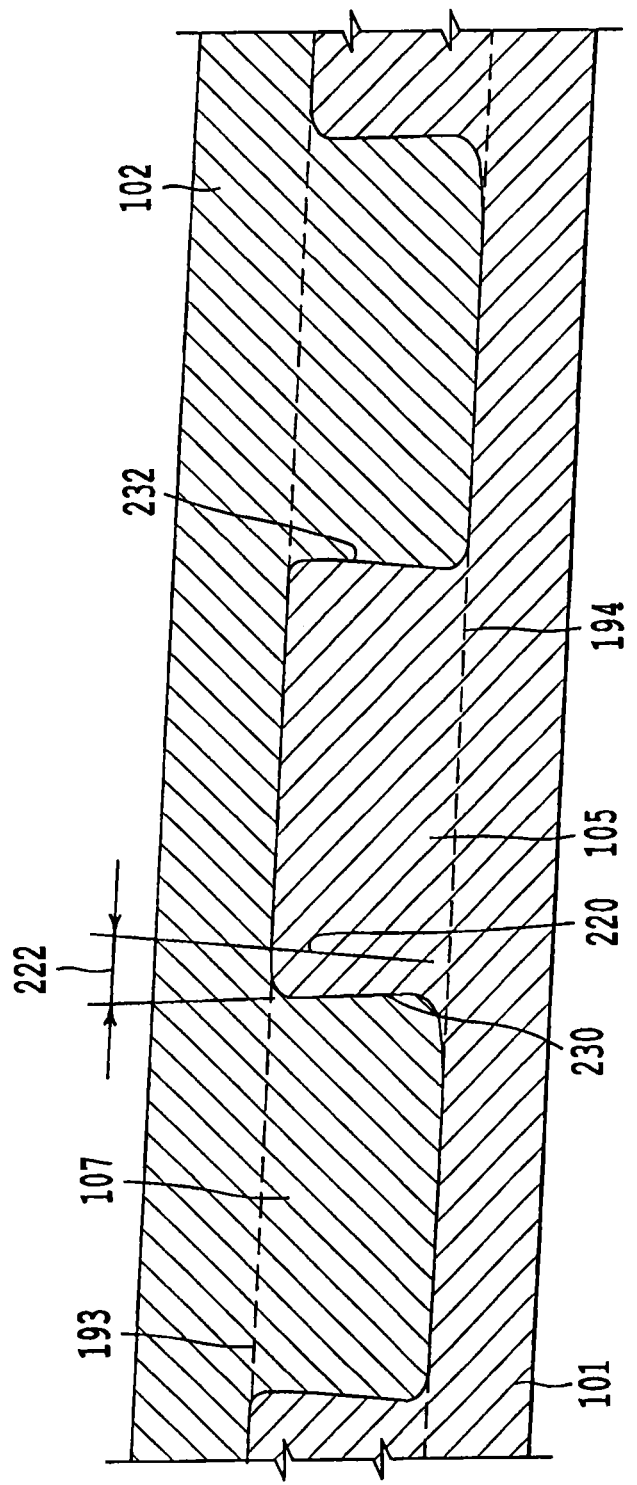
FIG. 3 is a detailed cross-sectional view of one of the thread run-in portions of the joint illustrated in FIG. 1, according to a non-limiting embodiment of the present invention.

FIGS. 1-3 illustrate an example connection that has a tensile efficiency ranging from about 81% to about 92%, and preferably from about 85% to about 92%. As explained in greater detail below, the present example does not utilize a center shoulder. In another aspect, the present example maximizes an internal pressure resistance of the connection by allocating more material thickness at a radius outside the radius of the off-center seal (away from a centerline axis of the connection) than within the radius of the off-center seal (toward a centerline axis of the connection). The present example, without limitation, also employs dovetail-shaped threads with negative load flanks to provide and axial locking effect upon make-up and to avoid or reduce risk of jump-out of the threads under tension in, for example, an oil well.

FIG. 1 shows a connection that includes a first tubular member and a second tubular member. The first tubular member is provided with a tubular male end 101 and the second tubular member is provided with a tubular female end 102. The tubular male end 101 of the first tubular member is referred to as the "pin," and the female end 102 of the second tubular member is referred to as the "box." The example in FIG. 1 is a threaded semi-flush connection, i.e. a connection in which the box outside diameter is only slightly larger than the pipe outside diameter, where the two members, pin 101 and box 102, are end-formed. Each of the pin 101 and the box 102 include two steps of tapered threads and an off-center seal 125. The pin includes a small diameter thread section 104 and a large diameter thread section 105. The box includes a small diameter thread section 106 and a large diameter thread section 107. The connection has an internal thread portion (104, 106) and an external thread portion (105, 107). The off-center seal portion 125 is located between the internal thread portion (104, 106) and the external thread portion (105, 107).

The configuration of the threads of the connection shown in FIG. 1 may be similar to that described with reference to the example in FIGS. 4 and 5. Thus, each step of thread comprises a run-in portion on the side of the free end (terminal end) of the member and a run-out portion on the opposite side. Each run-in portion on the pin 101 engages a run-out portion on the box 102, and each run-in portion on the box 102 engages a run-out portion on the pin 101. The run-in and run-out sections may be full run-in/run-out sections, or incomplete run-in/run-out sections, i.e. in this latter case the thread height do not decrease to zero. The thread height vanishing rate may also change along the run-in/run-out section to avoid a long threaded portion. In addition, as will be discussed in further detail with reference to FIG. 3, the transition point between run-in and run-out sections of engaged threads may not be at the same location.

Figure 6:
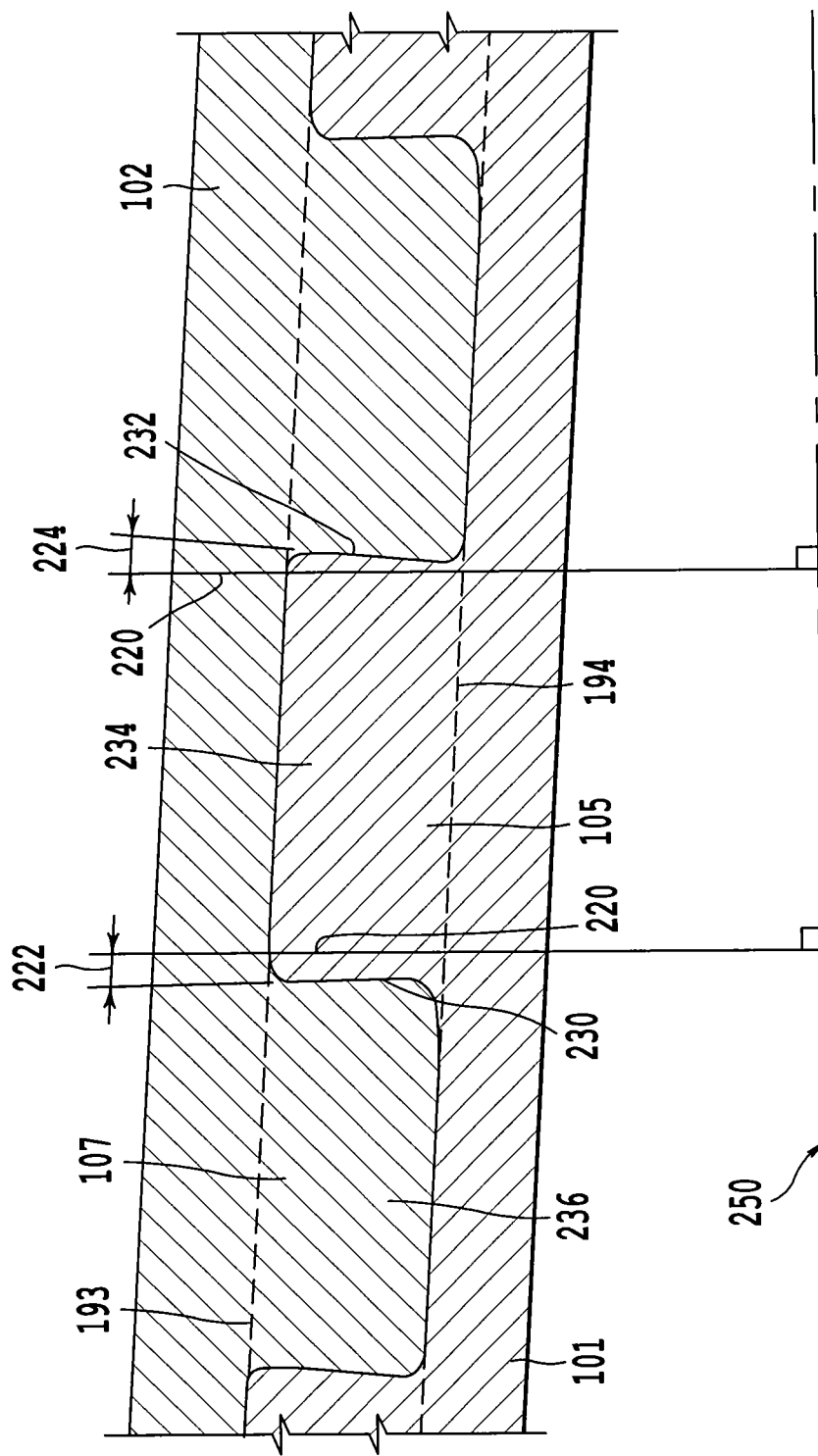
FIG. 6 is a detailed cross-sectional view of one of the thread run-in portions of the joint of FIG. 1, according to a non-limiting embodiment of the present invention.

Alternatively, the configuration of the threads of the connection shown in FIG. 1 may be dovetail-shaped as shown in FIG. 6. An axial cross section of a dovetail-shaped thread 234 on the pin 101 increases in axial width with increasing distance from the connection centerline. Likewise, an axial cross section of a dovetail-shaped thread 236 on the box 102 increases in axial width with decreasing distance from the connection centerline.

A load flank 230 of the dovetail-shaped thread 234 may have a negative load angle 222. The load angle 222 is defined between a cross sectional surface of the load flank 230 and a line 220 extending perpendicular to the axis 250 of the element. In one embodiment, the load angle 222 is between about −0.5 degrees and about −1.5 degrees. In another embodiment of the invention, the load angle 222 is between about −0.9 degrees and −1.1 degrees. In yet another embodiment of the invention, the load angle 222 is about −1 degrees.

A stab flank 232 of the dovetail shaped thread 234 may have a negative stab angle 224. The stab angle 224 is defined between a cross sectional surface of the stab flank 232 and a line 220 extending perpendicular to the axis 250 of the element. In one embodiment, the stab angle 224 is between about −3.5 degrees and about −4.5 degrees. In another embodiment of the invention, the stab angle 224 is between about −3.9 degrees and −4.1 degrees. In yet another embodiment of the invention, the stab angle 224 is about −4 degrees.

In order to increase the tensile efficiency of the connection illustrated in FIG. 1, in addition to a two step connection with run-in and run-out portions at the ends of each thread, this example includes a particular balance between four critical sections of the connection. These sections include a pin critical cross-section (PCCS) 171, a box intermediate critical cross-section (BICCS) 172, a pin intermediate critical cross-section (PICCS) 173, and a box critical cross-section (BCCS) 174. PCCS 171 is a cross-sectional area of the pin (also referred to as a tubular male end) 101 which undergoes full tension transferred across all threads and which is located at an end of the tubular male end 101 opposite the free end (terminal end) of the tubular male end 101. BCCS 174 is a cross-sectional area of the box (also referred to as the tubular female end) 102 which undergoes full tension transferred across all threads and which is located at an end of the tubular female end 102 opposite the terminal end of the tubular female end 102. BICCS 172 is a cross-sectional area of the tubular female end 102 which undergoes tension transferred across the external thread portion 107 of the tubular female end 102 and which is located at an end of the external thread portion 107 opposite the free end (terminal end) of the tubular female end 102. PICCS is a cross-sectional area of the tubular male end 101 which undergoes tension transferred across the internal thread portion 104 of the tubular male end 101 and which is located at an end of the internal thread portion 104 opposite the free end (terminal end) of the tubular male end 101.

If a cross-sectional area at one of these four noted critical sections of the connection are not high enough, a rupture may result at that location. PCCS and BCCS represent a risk of rupture near the end of, respectively, the pin 101 and the box 102. The sum PICCS and BICCS represents the risk of rupture by tension near the off-center seal 125. The inventors of the present application have recognized that improved tensile efficiency can be achieved by satisfying the following particular relationship:

PCCS~(BICCS+PICCS)~BCCS

In the present example, the symbol "~" is intended to mean equal within ±5%.

The inventors have recognized that balancing the efficiency between the above-noted four critical sections in the manner set forth above maximizes and maintains the efficiency of the connection (~90%) while maximizing the seal area in order to gain more torque resistance and still ensuring the axial performance of the connection.

Further, the relationship between critical sections could involve smaller differences of 2% or even 1%. Preferably the sum of PICCS and BICCS is larger than the highest of PCCS and BCCS in order to prevent rupture near the off-center seal. In a preferred embodiment, the tubular connection does not include any torque shoulder. In another embodiment, the threaded tubular connection the off-center seal 125 is the only fluid tight seal within the threaded tubular connection.

As shown in FIG. 2, the seal 125 of the present example has a seal surface 152 on the pin 101 providing a seal in the radial direction with a seal surface 162 on the box 102. Thus, when the connection is made-up, the seal surfaces 152 and 162 of the pin and box are in tight contact due to radial interference between them.

As shown in FIG. 2 the box and the pin surfaces are shaped to provide a radial clearance 210 between a surface 153 on the pin and the corresponding surface 163 on box. These surfaces do not make a seal.

A second clearance 212 is located between the seal 125 and the threads on the opposite side of the seal 125 from clearance 210. Clearance 212 is a radial clearance which is formed between cylindrical surfaces 151 and 161, respectively, on the pin 101 and the box 102. Clearance 210 is configured to relieve stress in the short thread sections 104 and 106 at make-up. The clearances 210 and 212 can be symmetrical. In a preferred embodiment, the clearances 210 and 212 are not symmetrical and a groove defined by surface 153 can be added to allow more flexibility of seal surface 152. The flexibility can mitigate or remove stress concentration on the seal 125 as well as slightly increase the sealing performance. The groove 153 can be positioned at the transition angle of the box seal, and rounded up to the nearest 0.5 mm. The diameter of the grove 153 can be 1 mm diametrically less than the pin seal 125.

Referring back to FIG. 1, the threaded tubular connection according to a non-limiting embodiment of the present invention includes a first tube with a pin member 101 extending from an end of a main body of the first tube to a terminal end of the first tube. The pin member 101 includes two radially offset sections of external threads: a first thread section 104 and a second thread section 105. The first thread section 104 is separated from the second thread section 105 by a first seal surface 152. The first thread section 104 is located between the terminal end of the first tube and the first seal surface 152. The second thread section 105 is located between the first seal surface 152 and the end of the main body of the first tube.

A second tube includes a box member 102 extending from an end of a main body of the second tube to a terminal end of the second tube. The box member includes two radially offset sections of internal threads: a third thread section 107 and a fourth thread section 106. The third thread section 107 is separated from the fourth thread section 106 by a second seal surface 162. The third thread section 107 is located between the terminal end of the second tube and the second seal surface 162. The fourth thread section 106 is located between the second seal surface 162 and the end of the main body of the second tube.

The pin member includes the pin critical cross-section (PCCS) 171 located at a thread engaged root of the second thread section that is closest to the end of the main body of the first tube. The box member includes the box critical cross-section (BCCS) 174 located at a thread engaged root of the fourth thread section that is closest to the end of the main body of the second tube. The box member 102 includes the box intermediate critical cross-section (BICCS) 172 located at a thread engaged root of the third thread section that is closest to the second seal surface of the second tube. The pin member 101 includes the pin intermediate critical cross-section (PICCS) 173 located at a thread engaged root of the first thread section that is closest to the first seal surface of the first tube.

In a made-up state, the first seal surface 152 engages the second seal surface 162 in a radial direction so as to form a fluid tight off-center seal 125 that extends in an axial direction of the threaded tubular connection. In this embodiment, the seal 125 is off-center because it is located closer to the terminal end of the first tube than to the terminal end of the second tube. The first and second tubes satisfy the following relations:

PCCS is within approximately ±5% of BCCS, each of PCCS and BCCS is within approximately ±5% (BICCS+PICCS), and BICCS/PICCS is not less than 2.0.

In a preferred embodiment, BICCS/PICCS is between 2 and 5. In another embodiment, BICCS/PICCS is between 2.5 and 3.0. In yet another embodiment, BICCS/PICCS is not less than the greater of 2.0 and not less than 30.8*OACE−25, wherein OACE is an overall connection efficiency in a decimal format.

According to an embodiment of the present invention, in the made-up state, the fluid tight off-center seal 125 can be separated from the second thread section 105 and the third thread section 107 in the axial direction of the threaded tubular connection by a first clearance portion 153/163, the pin 101 and the box 102 being spaced apart from each other in the radial direction at the first clearance portion 153/163 such that a first clearance 210 is formed between the pin and the box at the first clearance portion 153/163. The first clearance 210 can include an axial clearance of from 3 mm to 15 mm, and a radial clearance from 0.125 mm to 0.4 mm.

According to an embodiment of the present invention, in the made-up state, the fluid tight seal 205 is separated from the first thread section 104 and the fourth thread section 106 in the axial direction of the threaded tubular connection by a second clearance portion 151/161. The pin and the box are spaced apart from each other in the radial direction at the second clearance portion 151/161 such that a second clearance 212 is formed between the pin 101 and the box 102 at the second clearance portion 151/161. The second clearance 212 can include an axial clearance of for example, 0.1 mm to 2 mm at make-up.

In a preferred embodiment, the first, second, third, and fourth thread sections each include dovetail-shaped threads. The load flank of the dovetail-shaped threads can have a negative slope. The dovetail-shaped threads can have a stab flank angle between −3.5 and −4.5 degrees. The stab flank angle can be between −3.9 and −4.1 degrees. The dovetail-shaped threads can have a load flank angle between −0.5 and −1.5 degrees. In a preferred embodiment, the load flank angle is between −0.9 and −1.1 degrees. In one embodiment, the crests and roots can be parallel to the thread taper. In an non-limiting example, there is no designed flank interference, with the threads being designed to lock when the thread width of the box and pin are equal and become engage during make-up. In one embodiment, the threads do not form a fluid-tight seal.

In a preferred embodiment, the threads can have an increasing variable width. The load flanks and stab flanks have different leads so as to create variable width thread, but there is no change over the thread length and there are no perturbations. In one embodiment, the thread wedge ratio for the first, second, third and fourth thread sections is the same. The wedge ratio can be selected based on geometrical considerations, such as thread length, flank angles, flank pitch, flank radii and thread height. The wedge ratio can also be selected based on manufacturing considerations such as manufacturing cycle time, number of passes and the dimensions of the cutting insert. In a non-limiting embodiment, the wedge ratio can be within 3-6%, or between 3.5% and 4.5%, or between 4% and 4.25%. In a non-limiting embodiment, the thread pitches can be within the range of 2-5 TPI, or within 3-4 TPI.

In a preferred embodiment, each of PCCS and BCCS is within approximately ±3% (BICCS+PICCS). In another embodiment, each of PCCS and BCCS is within approximately ±2% (BICCS+PICCS). In a preferred embodiment, (BICCS+PICCS) is greater than PCCS and BCCS.

In a preferred embodiment, the tensile efficiency of the threaded tubular connection is between from about 81% to about 92%, and preferably from about 85% to about 92%. In another embodiment the tensile efficiency of the threaded tubular connection is between 89% and 91%. In another embodiment, the tensile efficiency of the threaded tubular connection is between 89% and 90%.

In a preferred embodiment, PCCS is within approximately ±5% of BCCS, each of PCCS and BCCS is within approximately ±5% (BICCS+PICCS), and an overall length of the second (and/or third) thread section divided by an overall length of the first (and/or fourth) thread section is not less than 2.0. In a preferred embodiment, such a thread length ratio of the long to short thread sections is between 2.0 and 4, and preferably between 2.5 and 4. In another embodiment, the thread length ratio is not less than the greater of 2.0, and not less than 37.2*OACE−30.5, where OACE is an overall connection efficiency in a decimal format, such as 90%.

In another embodiment, the total number of threads in the second thread section divided by a total number of threads in the first thread section is greater than 1.5 and less than 3.0. In yet another embodiment, the total number of threads in the second thread section divided by the total number of threads in the first thread section is greater than 1.7 and less than 2.5. In another embodiment, the total number of threads in the second thread section divided by the total number of threads in the first thread section is greater than 1.5 and not less than 19.2*OACE−15.3 wherein OACE is an overall connection efficiency in a decimal format, such as 89%.

The connection illustrated in FIG. 4 does not follow the above-noted relationship between critical sections. Instead, the connection in FIG. 4 features lower connection critical section ratios (in % when compared to pipe cross section) and thus a tensile efficiency of the connection (i.e. the smallest of the connection ratios) that is smaller than for the example set forth in FIGS. 1-3.

In the connection in FIG. 4, radial space occupied by seal surfaces 27, 28 at thick ends of the male element 1 and the female element 2 reduce PCCS and BCCS. By contrast, the example in FIGS. 1-3 includes an off-center seal configuration which allows the thick ends of large diameter thread 105 on pin and of the small diameter thread 106 on the box to be made thicker than for the connection in FIG. 4 without major drawbacks and thus to insure the novel relationship between critical sections set forth above.

Choice of a sole off-center seal 125 in FIG. 1 in place of two terminal seals 27, 28 in FIG. 4 allows to decrease the radial space occupied by the seals and then to increase both PCCS and BCCS. Such choice also render the connection less sensitive to risk of jump out of pin and box due to dope pressure in case of overdoping, lubrication dope not being confined between terminal seals.

Seal surfaces 152 and 162 of seal 125 can be both conical surfaces of substantially same taper or one of surfaces 152 and 162 can be a convexly bulged surface, for example a torical surface defined by a torus radius between 10 and 100 mm, and the other surface can be conical. For example a seal taper of ⅙ (16.7%) can be selected. The configuration of the seal surfaces 152 and 162 can be selected based on sealing considerations, and need not be selected based on galling reduction considerations.

As noted above, the pin and box thread run-ins are based on the cylindrical-conical connection illustrated in FIG. 4. Having a cylindrical-conical pin run-in on the external threaded section and a cylindrical-conical box run-in on the internal threaded section maximizes the shoulder area as follows: (cylindrical run-in length*thread taper)/2=increase of shoulder height due to one run-in thread portion. As there are one run-in thread portion each side of the shoulder 124 (one on the pin, the other one on the box), the total shoulder height increase will be the sum of the increases due to each run-in thread portion. FIG. 3 illustrates a detailed cross-sectional view of one of the thread run-in portions of the joint illustrated in FIG. 1. Specifically FIG. 3 illustrates a run-out portion of threads 107 of box 102, and a run-in portion of threads 105 of pin 101. Lines 193 and 194 represent lines that follow a tapered path. Pin roots in the run-in thread portion are tapered due to shape of the machining insert.

The transition point between run-in and run-out section of engaged threads is not necessarily at the same location. The thread cylindrical length of the run-in portions can be, for example, between 3 to 4 threads pitch.

The thread taper can be from ⅛ (5.555%) to ⅙ (16.67%). Selecting the thread taper for each size of connection helps to:
1. ensure the efficiency of the connection PCCS~(BICCS+PICCS)~BCCS;
2. ensure a sufficient developed thread area to avoid jump-out; and
3. maximize the shoulder height, to maximize the torque capability and/or resistance to compression loads or to bending loads.

The thread taper can be different between the two stepped threads 104 (106) and 105 (107).

The length of two internal and external thread portions is different in order to maximize the efficiency of the intermediate cross sections. The internal thread portion length can be, for example, from less than 100% to 10% of the external thread portion and preferably less than 50% of the external thread portion.

In addition, the total developed thread area can be greater than 130% but not larger than 250% of the lowest critical section between PCCS and BCCS.

Obviously, numerous modifications and variations of the present invention are possible in light of the above teachings. It is therefore to be understood that within the scope of the appended claims, the invention may be practiced otherwise than as specifically described herein.

Also hook threads of FIG. 5 can be replaced by other thread profiles.

Dry lubrication can also be used in place of standard compound dope (RP API 5A3) to implement small radial clearances 210 and 212.

We claim:
1. A threaded tubular connection, comprising:
a first tube, the first tube including a pin member extending from an end of a main body of the first tube to a terminal end of the first tube, the pin member including two radially offset sections of external threads, the two radially offset sections of external threads including a first thread section and a second thread section, the first thread section being separated from the second thread section by a first seal surface, the first thread section being located between the terminal end of the first tube and the first seal surface and the second thread section being located between the first seal surface and the end of the main body of the first tube; and a second tube, the second tube including a box member extending from an end of a main body of the second tube to a terminal end of the second tube, the box member including two radially offset sections of internal threads, the two radially offset sections of internal threads including a third thread section and a fourth thread section, the third thread section being separated from the fourth thread section by a second seal surface, the third thread section being located between the terminal end of the second tube and the second seal surface and the fourth thread section being located between the second seal surface and the end of the main body of the second tube, wherein the pin member includes a pin critical cross-section (PCCS) located at a thread engaged root of the second thread section that is closest to the end of the main body of the first tube, the box member includes a box critical cross-section (BCCS) located at a thread engaged root of the fourth thread section that is closest to the end of the main body of the second tube, the box member includes a box intermediate critical cross-section (BICCS) located at a thread engaged root of the third thread section that is closest to the second seal of the second tube, and the pin member includes a pin intermediate critical cross-section (PICCS) located at a thread engaged root of the first thread section that is closest to the first seal of the first tube, wherein, in a made-up state, the first seal surface engages the second seal surface in a radial direction so as to form a fluid tight off-center seal that extends in an axial direction of the threaded tubular connection, wherein the tubular connection does not include a torque shoulder, wherein the first and second tubes satisfy the following relations:
PCCS is within approximately ±5% of BCCS,
each of PCCS and BCCS is within approximately ±5% (BICCS+PICCS), and
BICCS/PICCS is not less than 2.0.

2. The threaded tubular connection according to claim 1, wherein the off-center seal is located closer to the terminal end of the first tube than to the terminal end of the second tube.

3. The threaded tubular connection according to claim 1, wherein BICCS/PICCS is between 2.0 and 5.0.

4. The threaded tubular connection according to claim 3, wherein BICCS/PICCS is between 2.5 and 3.0.

5. The threaded tubular connection according to claim 1, wherein the off-center seal is the only fluid tight seal within the threaded tubular connection.

6. The threaded tubular connection of claim 1, wherein, in the made-up state, the fluid tight off-center seal is separated from the second thread section and the third thread section in the axial direction of the threaded tubular connection by a first clearance portion, the pin and the box being spaced apart from each other in the radial direction at the first clearance portion such that a first clearance is formed between the pin and the box at the first clearance portion.

7. The threaded tubular connection of claim 6, wherein the first clearance includes an axial clearance of from 3 mm to 15 mm, and a radial clearance from 0.125 mm to 0.4 mm.

8. The threaded tubular connection of claim 6, wherein, in the made-up state, the fluid tight off-center seal is separated from the first thread section and the fourth thread section in the axial direction of the threaded tubular connection by a second clearance portion, the pin and the box being spaced apart from each other in the radial direction at the second clearance portion such that a second clearance is formed between the pin and the box at the second clearance portion.

9. The threaded tubular connection of claim 8, wherein the second clearance includes an axial clearance of from 0.1 mm to 2 mm.

10. The threaded tubular connection of claim 1, wherein the first, second, third, and fourth thread sections each include dovetail-shaped threads, a load flank of the dovetail-shaped threads having a negative slope.

11. The threaded tubular connection of claim 10, wherein the dovetail-shaped threads have a stab flank angle between −3.5 and −4.5 degrees.

12. The threaded tubular connection of claim 11, wherein the stab flank angle is between −3.9 and −4.1 degrees.

13. The threaded tubular connection of claim 12, wherein the load flank angle is between −0.9 and −1.1 degrees.

14. The threaded tubular connection of claim 11, wherein the dovetail-shaped threads have a load flank angle between −0.5 and −1.5 degrees.

15. The threaded tubular connection of claim 1, wherein each of PCCS and BCCS is within approximately ±2% (BICCS+PICCS).

16. The threaded tubular connection of claim 1, wherein a tensile efficiency of the threaded tubular connection is between 81% and 92%.

17. A threaded tubular connection, comprising:
a first tube, the first tube including a pin member extending from an end of a main body of the first tube to a terminal end of the first tube, the pin member including two radially offset sections of external threads, the two radially offset sections of external threads including a first thread section and a second thread section, the first thread section being separated from the second thread section by a first seal surface, the first thread section being located between the terminal end of the first tube and the first seal surface and the second thread section being located between the first seal surface and the end of the main body of the first tube; and a second tube, the second tube including a box member extending from an end of a main body of the second tube to a terminal end of the second tube, the box member including two radially offset sections of internal threads, the two radially offset sections of internal threads including a third thread section and a fourth thread section, the third thread section being separated from the fourth thread section by a second seal surface, the third thread section being located between the terminal end of the second tube and the second seal surface and the fourth thread section being located between the second seal surface and the end of the main body of the second tube, wherein the pin member includes a pin critical cross-section (PCCS) located at a thread engaged root of the second thread section that is closest to the end of the main body of the first tube, the box member includes a box critical cross-section (BCCS) located at a thread engaged root of the fourth thread section that is closest to the end of the main body of the second tube, the box member includes a box intermediate critical cross-section (BICCS) located at a thread engaged root of the third thread section that is closest to the second seal of the second tube, and the pin member includes a pin intermediate critical cross-section (PICCS) located at a thread engaged root of the first thread section that is closest to the first seal surface of the first tube, wherein, in a made-up state, the first seal surface engages the second seal surface in a radial direction so as to form an off-center fluid tight seal that extends in an axial direction of the threaded tubular connection, wherein the tubular connection does not include a torque shoulder, wherein the first and second tubes satisfy the following relationships:

PCCS is within approximately ±5% of BCCS, each of PCCS and BCCS is within approximately ±5% (BICCS+PICCS), and an overall length of the second thread section divided by an overall length of the first thread section is not less than 2.0.

18. The threaded tubular connection according to claim 17, wherein an overall length of the third thread section divided by an overall length of the fourth thread section is not less than 2.0.

19. The threaded tubular connection according to claim 17, wherein the overall length of the second thread section divided by the overall length of the first thread section is between 2.5 and 4.

20. The threaded tubular connection according to claim 17, wherein a total number of threads in the second thread section divided by a total number of threads in the first thread section is greater than 1.5 and less than 3.0.

* * * * *